UNITED STATES PATENT OFFICE 2,433,936

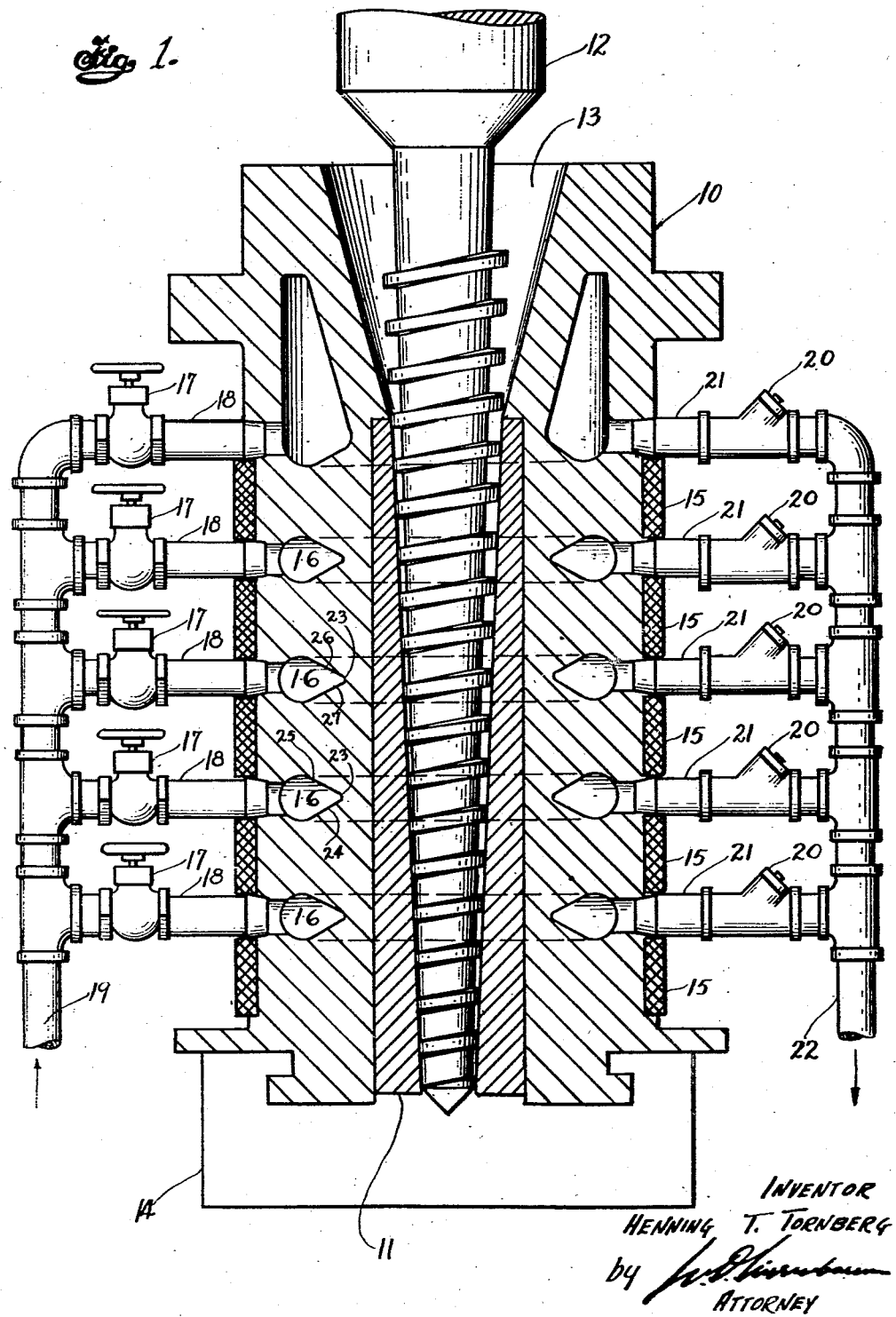

PLASTIC EXTRUDING MACHINE

Henning T. Tornberg, Cuyahoga Falls, Ohio, assignor to Modern Plastic Machinery Corporation, Wilmington, Del., a corporation of Delaware Application July 3, 1945, Serial No. 603,081

3 Claims. (Cl. 18—12)

The present invention relates to plastic extrusion machines and more particularly to their cylinder cooling system.

An object of this invention is to provide a novel and improved heated cylinder structure for plastic extrusion machines, wherein the cylinder is maintained cool without materially effecting efficient heat transference from the heating coils to the material to be plasticized within the cylinder.

Another object is to provide a novel and improved cooling structure for the cylinders of plastic extruders, which is efficient in carrying out the purposes for which it is designed.

Other objects and advantages will become apparent as this disclosure proceeds.

In the accompanying drawings forming part of this application, similar characters of reference indicate identical parts.

The single figure is a fragmentary, sectional view of a plastic extrusion machine, showing a central longitudinal section through the cylinder which is provided with cooling structure in accordance wtih the teachings of this invention.

In the drawings, the numeral 10 indicates the cylinder which may have a liner 11. Within this liner, is longitudinally positioned the screw 12, adapted for axial rotation, whereby material from within the hopper-communicating space 13, is conveyed through the cylinder 10, and finally discharged into the die which is indicated diagrammatically at 14. The material in passing through the cylinder 10, is plasticized due to action of heat from heating coils 15, mounted in spaced relation along and about the cylinder 10. Ducts 16 in the cylinder body, are provided for the flow therethrough of cooling media, the passage through each of which is independently controlled by means of the hand operated valves 17, in the pipe branches 18, from an inlet pipe 19. Said cooling media leave said ducts 16 through check valves 20, in the respective pipe branches 21, connected to a discharge pipe 22. The heaters 15 may be electric heating coils.

Ducts 16 are in the zones of the cylinder structure between the coils 15, and the shape of their respective cross sections are each such that their walls converge inwardly at 23 towards the longitudinal axis of the cylinder 10. That is, walls 24 and 25 converge, as do walls 26 and 27 of successive ducts, and it is to be noted that walls 23 and 24 are divergent with respect to each other. Such structural conditions maintain throughout the series of ducts.

It is found that such relative location of heating coils 15 and cooling ducts 16, and the particular cross-sectional shape of said ducts, affords full transmission of the heat emanating from said coils 15 to material conveyed through the cylinder to be plasticized, substantially avoiding the transmission of heat from said coils 15 directly to the cooling ducts, for the shape of the latter places them outside the path of heat ray travel. Thus the effect of the media through the ducts 16 is only to cool the cylinder, and the heat of the coils 15 is spent directly for plasticizing purposes, for the ducts are away from the normal paths of the heat emanations.

This invention is capable of various forms and numerous applications without departing from the essential features herein disclosed. It is therefore intended and desired that the embodiment herein be deemed illustrative and not restrictive and that the patent shall cover all patentable novelty herein set forth; reference being had to the following claims rather than the specific description herein to indicate the scope of this invention.

I claim:

1. In a plastic extruder, a cylinder having a longitudinal bore through which material to be plasticized is adapted to pass and a series of ducts in spaced relation surrounding said bore, adapted for passage therethrough of cylinder cooling media; each of said discs having walls converging substantially to intersection towards the axis of said bore, and a series of heating members on the cylinder and in spaced relation therealong; the zones of the ducts being respectively between the respective zones of successive heating members.

2. A plastic extruder as defined in claim 1, wherein the cross-sectional area of each of the ducts is substantially symmetrical with respect to a normal to the axis of the cylinder bore and substantially symmetrical with respect to adjacent heating members.

3. A plastic extruder as defined in claim 1, wherein the converging walls of each of the ducts are symmetrical with respect to a plane normal to the axis of the cylinder bore.

HENNING T. TORNBERG.

REFERENCES CITED

The following references are of record in the file of this patent:

UNITED STATES PATENTS

| Number | Name | Date |
| --- | --- | --- |
| 603,081 | Bailey | Dec. 19, 1944 |